(No Model.)
A. N. THOMPSON.
BICYCLE.
No. 456,604.  Patented July 28, 1891.
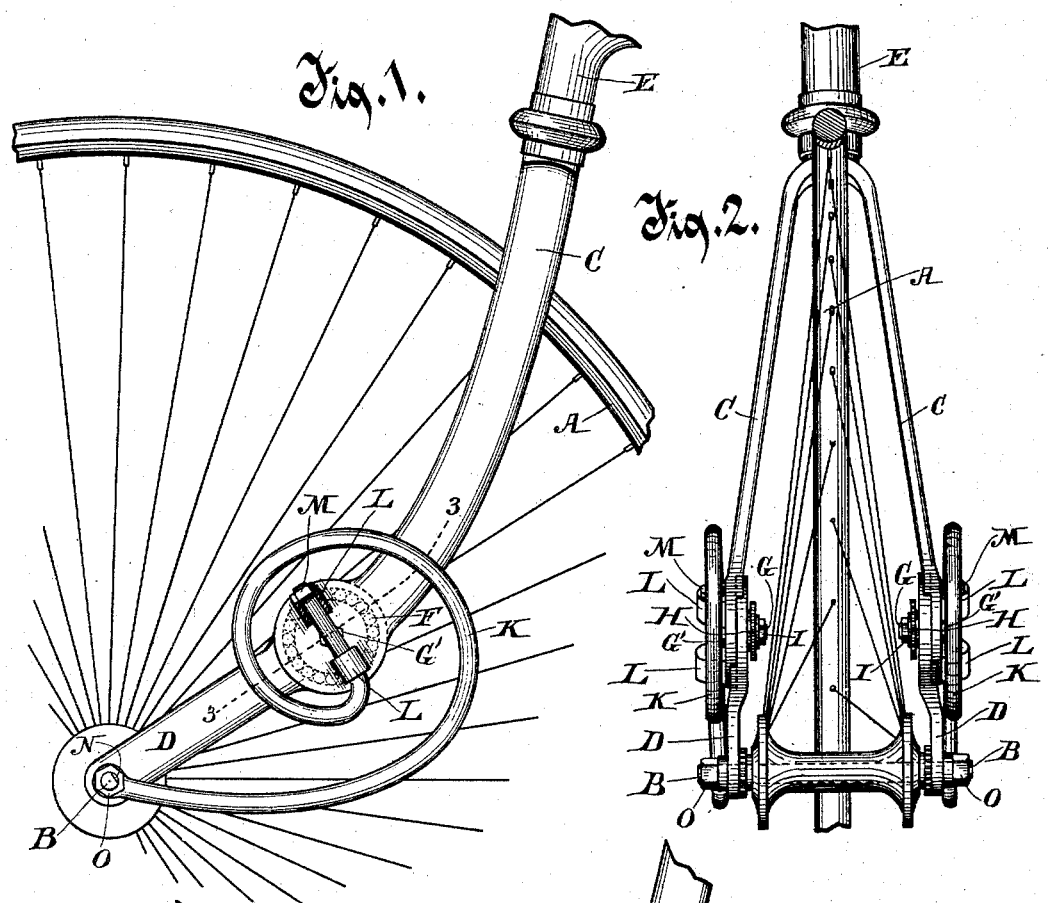
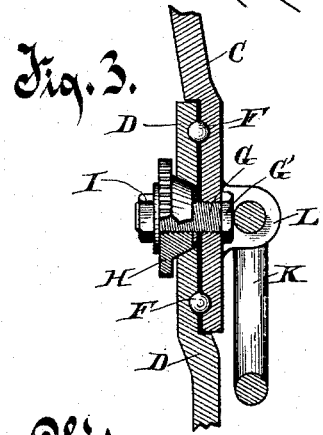
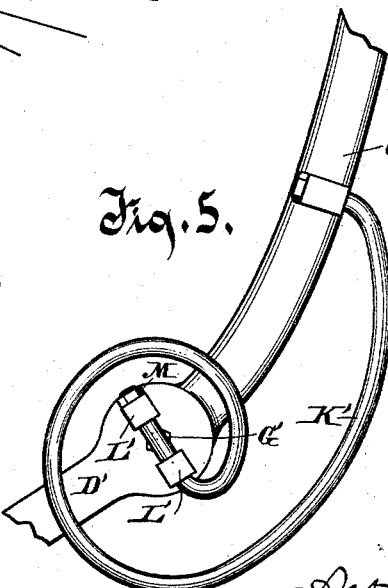
Witnesses.
Inventor.
Arthur N. Thompson
Curtis T. Benedict
Attorney.
THE NORRIS PETERS CO., PHOTO-LITHO., WASHINGTON, D. C.

UNITED STATES PATENT OFFICE.

ARTHUR N. THOMPSON, OF MILWAUKEE, WISCONSIN.

BICYCLE.

SPECIFICATION forming part of Letters Patent No. 456,604, dated July 28, 1891.

Application filed September 15, 1890. Serial No. 365,032. (No model.)

*To all whom it may concern:*

Be it known that I, ARTHUR N. THOMPSON, of Milwaukee, in the county of Milwaukee and State of Wisconsin, have invented a new and useful Improvement in Bicycles, of which the following is a description, reference being had to the accompanying drawings, which are a part of this specification.

In particular my invention relates to improvements in the fork and allied parts that support the front end of the backbone on the axle of the front wheel, being especially adapted for use with such bicycles as have two wheels of equal or nearly equal diameter.

The object of the invention is to provide a form of device so constructed and arranged as to be strong and firm in parts requiring strength and steadiness, to have wide bearings and true action where torsion or wabbling or undue play of parts is to be avoided, and to secure the greatest possible ease of motion where oscillation or rotation or elasticity of parts is involved.

Figure 1 is a fragment of a bicycle-wheel with a portion of the jointed fork and its spring. Fig. 2 is a front view of the same parts shown in Fig. 1. Fig. 3 is a section of a portion of the device taken on line 3 3 of Fig. 1. Fig. 4 is a detail illustrating the method of securing the fork and its spring to the axle. Fig. 5 is a fragmentary portion of the fork with its spring in modified form.

A indicates the front wheel of a bicycle, and B is its axle loose in the hub. The two arms of the fork are each formed in two parts C C and D D. The upper parts C C of the fork unite together at the top and are attached to or constructed integral with the upwardly-continuing standard E, to which the front end of the backbone and the steering-handle are secured. The backbone and the handle are not shown in the drawings, as they are such as are in common use and are no part of my invention. The lower ends of the arms C C of the fork are considerably enlarged and are each constructed with a bearing-surface of considerable size in a vertical plane opposite to corresponding enlarged bearing-surfaces formed on the upper ends of the lower parts D D of the arms, which enlarged vertical bearing-surfaces in the arms C C and D D are provided with registering annular grooves in which are anti-friction balls F F of such size as to fit and travel nicely in the grooves and to prevent the parts C and D from bearing directly on each other. The parts C and D of the arms of the fork are joined to each other at their respective ends, and the two parts together form a jointed arm having a continuous slightly-curved axial line upwardly and rearwardly from the axle of the front wheel. The parts C and D are hinged to each other by pivots G G, which are preferably constructed with screw-threads turning in the parts C, so as practically to be rigid thereto, and also turning in the beveled nuts H H, which beveled or tapering nuts H bear against the tapering walls of corresponding apertures in the parts D D. The tapering nuts H, while they receive the bearing of the parts C C thereon, are also so constructed as not to extend entirely through the parts D D, but so as to be adapted to be drawn somewhat farther into the parts D D from time to time, as may be necessary to take up any wear of the parts in and about the joint between the parts C and D. The low thin heads G', G' of the bolts G G turn tightly down against the parts C C, and jam-nuts I I turn by screw-threads on the inner ends of the pivots against the beveled nuts H H. The enlarged bearing of this joint is adapted to prevent any torsion or wabbling of the fork at this point, while the use of anti-friction balls provides for a free movement of the parts of the fork, and the beveled nut-bearing is adapted for taking up the wear and preventing any undesirable play of the parts. Volute springs K K are attached at one end to the lower ends of the parts C C conveniently by being thrust through eyes or brackets L L, rigid on the parts C C at the point of their pivotal connection with the parts D D and secured therein by nuts M M, turning by a screw-thread on the ends of the springs. The other extremities of the springs are secured rigidly to the axle B. It is very desirable that the springs and the parts D D of the fork should be secured rigidly to the axle and in such manner as not to be likely to get loose or change position thereon to any extent whatever, and to secure such reliable and unyielding connection of the springs and parts D D to the axle I form a face N on one side of so much of the axle as is within the ends of the springs and the ends of the parts D D, and the apertures through the springs and through the parts D D are so formed as to fit tightly and accurately on the axle and particularly on the face N, whereby any rotary motion of the springs or the parts D D on the axle A is obviated. Nuts O O turn on the ends of the axle against the springs K K and retain them in position thereon.

In Fig. 5 a modified form of the device is shown, in which one end of the spring K' is inserted in brackets L' L', rigid on the part D', and the other extremity of the spring is secured to the part C' of the fork.

What I claim as new, and desire to secure by Letters Patent, is—

1. In a bicycle, the combination, substantially as described, of a backbone-supporting fork, the two arms of which are formed in two parts pivoted together at their joining extremities, the two parts forming the continuous arms extending upwardly and rearwardly from the axle of the wheel fixed in the lower extremities of the lower parts of the arms, enlarged faces bearing movably against each other on the joining extremities of the two parts of the arms, the planes of which faces are at right angles to the axle, annular grooves concentric with the pivot and registering with each other in the faces of the two parts, anti-friction balls in the grooves, and volute springs, one with each arm of the fork, secured rigidly at one end to one part of the arm of the fork at its joint with the other part and at its other end secured to the other part of the arm at a distance from its pivoted point.

2. In a bicycle, the combination, substantially as described, of a backbone-supporting fork, the two arms of which are each formed in two parts pivoted at their joining extremities, the two parts forming continuous arms extending upwardly and rearwardly from the axle of the wheel fixed in the lower extremities of the lower parts of the arms, enlarged faces bearing movably against each other on the joining extremities of the two parts of the arms, brackets or eyes fixed on opposite sides of the pivots on the lower extremities of the upper parts of the arms, and volute springs, one with each arm of the fork, one extremity of each of which springs is inserted in the eyes or brackets and is thereby secured rigidly to the upper part of the arm and the other end of which spring is secured rigidly to the axle of the wheel fixed in the lower extremities of the lower parts of the arms.

In testimony whereof I affix my signature in presence of two witnesses.

ARTHUR N. THOMPSON.

Witnesses:
C. T. BENEDICT,
ANNA FAUST.